(12) United States Patent
Oner et al.

(10) Patent No.: US 7,012,450 B1
(45) Date of Patent: Mar. 14, 2006

(54) TRANSMITTER FOR LOW VOLTAGE DIFFERENTIAL SIGNALING

(75) Inventors: Hakan Oner, San Jose, CA (US); Hakan Ates Gurcan, Los Gatos, CA (US); Ismail Okter, Saratogo, CA (US)

(73) Assignee: Decicon, Inc., San Jose, CA (US)

( * ) Notice: Subject to any disclaimer, the term of this patent is extended or adjusted under 35 U.S.C. 154(b) by 94 days.

(21) Appl. No.: 10/737,416

(22) Filed: Dec. 15, 2003

(51) Int. Cl.
*H03K 19/0175* (2006.01)

(52) U.S. Cl. .......................................... 326/86; 326/87
(58) Field of Classification Search ............ 326/82–83, 326/86–87; 327/108–109; 330/258–261
See application file for complete search history.

(56) References Cited

U.S. PATENT DOCUMENTS

| | | | |
|---|---|---|---|
| 6,111,431 A | | 8/2000 | Estrada |
| 6,356,141 B1 * | | 3/2002 | Yamauchi .................... 327/543 |
| 6,603,348 B1 * | | 8/2003 | Preuss et al. ................ 327/563 |
| 6,900,663 B1 * | | 5/2005 | Roper et al. .................. 326/83 |

* cited by examiner

*Primary Examiner*—James H. Cho
(74) *Attorney, Agent, or Firm*—Townsend and Townsend and Crew LLP

(57) ABSTRACT

A low-voltage differential signal driver includes, in part, a current sourcing circuit, a current steering circuit, and a current sinking circuit. The current steering circuit steers the current generated by the current sourcing circuit in one of first and second directions to generate a positive or a negative differential output voltage. The steered current flows to the ground via the current sinking circuit. A voltage dividing circuit divides the differential output voltage so generated. A first voltage regulating circuit receives a first reference voltage and regulates the voltage of a node common to both the current steering circuit and the current sinking circuit. A second voltage regulating circuit receives a first voltage supply to regulate the voltage signal generated by the voltage dividing circuit. To track the on-resistance of the transistors disposed in the current steering circuitry, a replicating circuit receives the first voltage supply and generates the first reference voltage.

31 Claims, 5 Drawing Sheets

TRANSMITTER FOR LOW VOLTAGE DIFFERENTIAL SIGNALING

FIELD OF THE INVENTION

The present invention is related to output drivers, and in particular to output drivers operative using low voltage differential signaling.

BACKGROUND OF THE INVENTION

In the communications field, there is a constant need to transmit larger amounts of digital data in shorter time intervals. In accordance with one method that is gaining increasing acceptance, data is transmitted over high-speed serial buses. These buses often carry digital data serially over a pair of conductors, driven either in a single-ended form or differentially. The differential drive method offers advantages over the single-ended drive method. The noise immunity of the differential method is greater than that of a comparable single-ended method. The improved noise immunity allows the use of lower signal amplitudes on the differential bus compared to the single-ended bus. Lower signal amplitudes often enable higher data transmission rates and lower overall power consumption.

One conventional standard for differential data transmission is referred to as the low voltage differential signaling (LVDS) standard, defined in "TIA/EIA-644, revision A, Electrical Characteristic of Low Voltage Differential Signaling (LVDS) Interface Circuits" and "ANSI/TIA/EIA-644, revision A, Jan. 30, 2001" published by Telecommunications Industry Association. This standard defines a differential data bus with a recommended maximum data signaling rate of 655 million bits per second on up to 5 meters of wire cable. The standard also requires that the generator, or transmitter, be able to generate a differential voltage signal in the range of 250 mV to 450 mV across a resistive load having a resistance of 100 Ω. The midpoint of the differential output voltage is defined as the offset voltage and is required to be between 1125 mV and 1375 mV.

FIG. 1 shows a known differential output driver 80 that conforms to the LVDS standard and is described in the U.S. Pat. No. 6,111,431. In FIG. 1, mimicking circuit MC generates two reference voltages at nodes ND1 and ND6. The voltage at node ND1 is replicated in node ND2 using operational amplifier OPAMP1 and PMOS transistor P2 of the driver circuit DC. Operational amplifier OPAMP1 and transistor P2 together form a voltage buffer. Similarly, the voltage at node ND6 is replicated in node COM using operational amplifier OPAMP2 and NMOS transistor N1 of the driver circuit DC. Operational amplifier OPAMP2 and transistor N1 together form a voltage buffer. Transistors N21, N22, N23 and N24 form an H-bridge and are used as switches. Load resistor $R_L$ is connected between nodes A and B of the H-bridge. Since the input signals IN and INB are complements of each other, depending on the polarity of these input signals, current $I_2$ flows from the H-bridge to transistor N1 either through the path defined by transistor N21, resistor $R_L$, and transistor N24, or through the path defined by transistor N22, resistor $R_L$, and transistor N23. The reference voltage levels are generated in MC such that when these voltages are replicated at nodes ND2 and COM, the resulting output voltage across resistor $R_L$ conforms to the LVDS standards.

BRIEF SUMMARY OF THE INVENTION

In accordance with the present invention, a low-voltage differential signal driver includes, in part, a current sourcing circuit, a current steering circuit, and a current sinking circuit. The current steering circuit steers the current generated by the current sourcing circuit in a first direction to generate a positive differential output voltage or in a second direction to generate a negative differential output voltage. The steered current flows to the ground via the current sinking circuit. The low-voltage differential signal driver further includes, in part, a voltage dividing circuit, a first voltage regulating circuit and a second voltage regulating circuit. The voltage dividing circuit divides the generated output voltage. The first voltage regulating circuit receives a first reference voltage and regulates the voltage of the node coupling the current steering circuit and the current sinking circuit. The second voltage regulating circuit receives a first supply voltage to regulate the voltage of the node carrying the divided output voltage.

In one embodiment, the first voltage regulating circuit includes a first operational amplifier whose output voltage is applied to the gate terminal of an MOS transistor disposed in the current sinking circuit. Similarly, the second voltage regulating circuit includes a second operational amplifier whose output voltage is applied to the gate terminal of an MOS transistor disposed in the current sourcing circuit. To track the on-resistance of the transistors disposed in the current steering circuitry, the low-voltage differential signal driver further includes, in part, a replicating circuit that receives the first supply voltage and, in response, generates the first reference voltage that is applied to the first operational amplifier.

To ensure that the currents flowing to the output terminals of the low-voltage differential signal driver do not exceed predefined values, a first current limiting circuitry is coupled between the current sourcing circuit and a second voltage supply, and a second current limiting circuitry is coupled between the current sinking circuit and the ground terminal. A tri-state output circuit that is coupled to the current steering circuit, tri-states the voltage signals present on the output terminals.

DETAILED DESCRIPTION OF THE INVENTION

Figure 1:
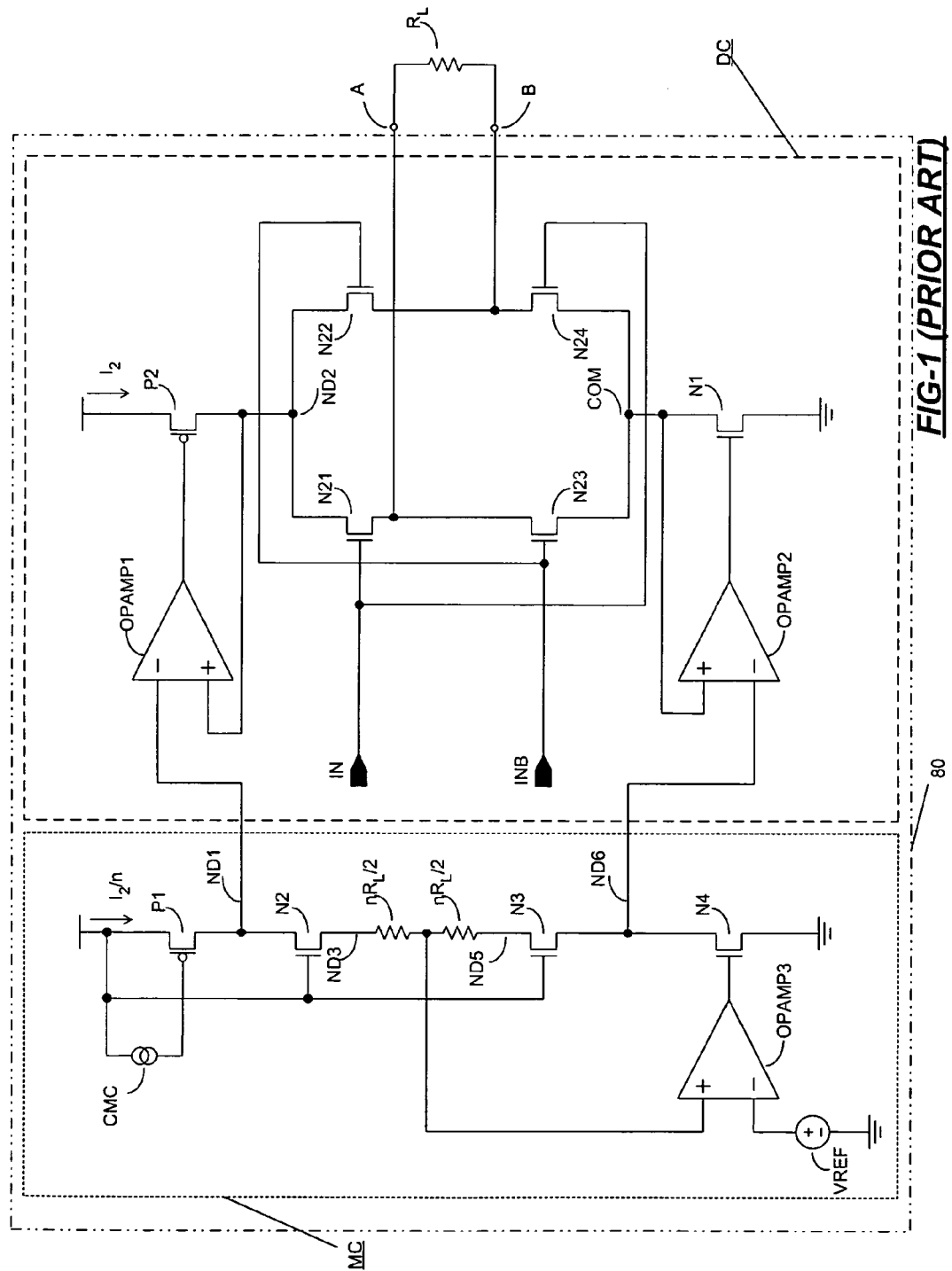
FIG. 1 is a schematic diagram of a low-voltage differential signal driver, as known in the prior art.
Figure 2:
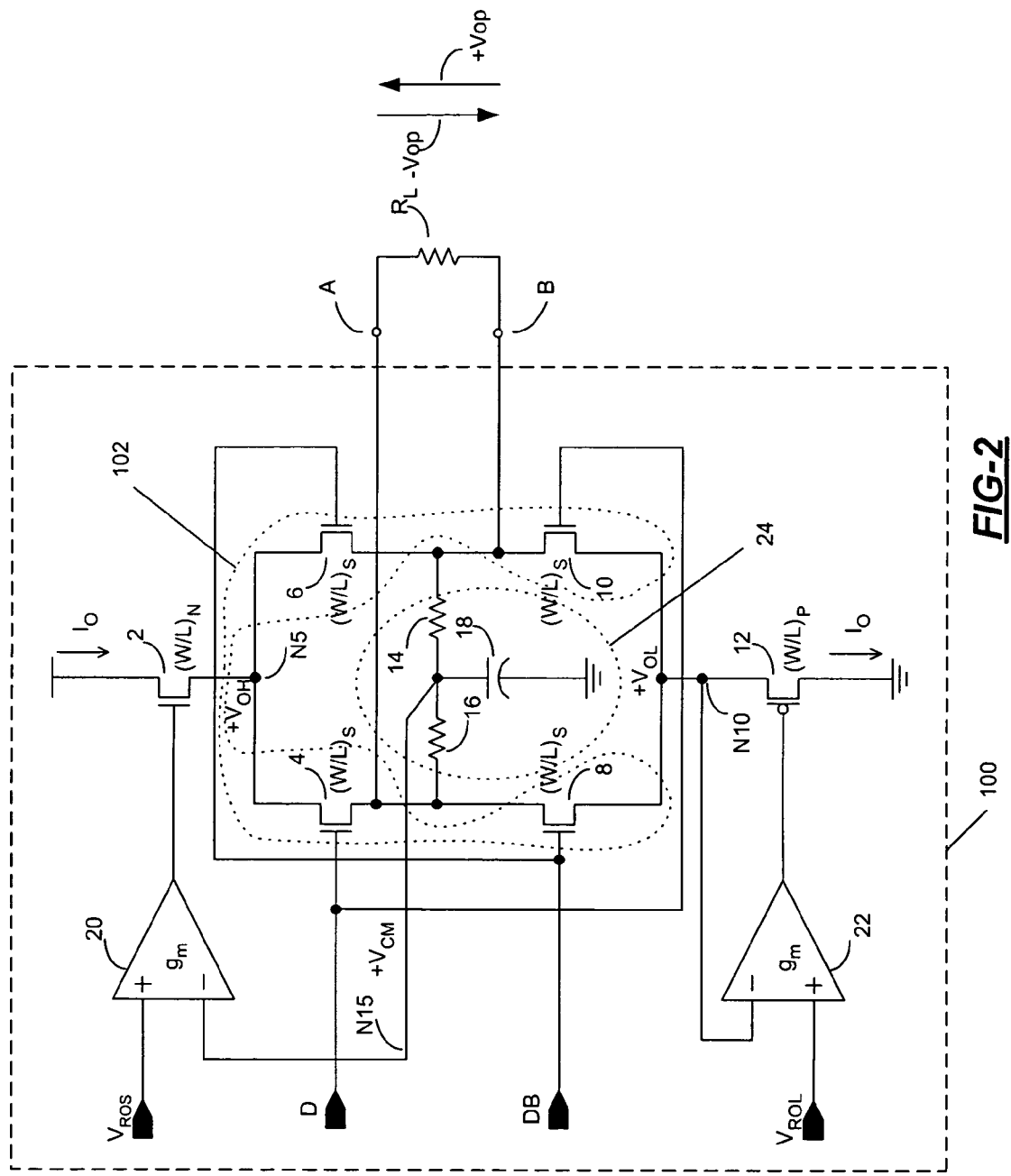
FIG. 2 is a schematic diagram of a low-voltage differential signal driver, in accordance with one embodiment of the present invention.

FIG. 2 is a schematic diagram of a low-voltage differential signaling (LVDS) output driver circuit 100, in accordance with one embodiment of the present invention. LVDS output driver circuit (hereinafter alternatively referred to as output driver) 100 uses a reference voltage and a pair of complementary control signals to generate output voltages at terminals A and B and that are compatible with the TIA/EIA-644-A standard.

Disposed, in part, in output driver 100 is an H-bridge current steering circuit 102, that includes NMOS transistor switches 4, 6, 8 and 10, a current sourcing circuit that includes NMOS transistor 2, and a current sinking circuit that includes PMOS transistor 12. Resistor $R_L$ coupled between terminals A and B represents the resistive load and is external to output driver 100. Output driver 100 further includes, in part, two control loops. The first control loop includes operational transconductance amplifier (OTA) 22 and PMOS transistor 12. The second control loop includes OTA 20, NMOS transistor 2, and a voltage dividing circuit 24 that, in combination, provide a common-mode feedback network. Voltage dividing circuit 24, in turn, includes resistors 14, 16 and capacitor 18.

Transistors 4, 6, 8 and 10 (these transistors are hereinafter alternatively referred to as switches) of the H-bridge 102 are controlled by input signals D and DB that have complementary rail-to-rail voltage levels. Therefore, each of input signals D and DB is either at a high or a low logic level. Input signal D is applied to the gate terminals of NMOS transistors 4 and 10, and input signal DB is applied to the gate terminals of NMOS transistors 6 and 8. Input signals D and DB steer current $I_O$ generated by NMOS transistor 2 through the load resistor $R_L$ before this current is delivered to the ground terminal via PMOS transistor 12. Depending on the polarity of the input signals, either a positive voltage $+V_{OP}$ or a negative voltage $-V_{OP}$ voltage is developed across load resistor $R_L$.

For simplicity, in the following each of switches 4, 6, 8, 10 is assumed to be an ideal switch. Therefore, each of these switches is assumed to have an on-resistance of zero and an off-resistance of infinity. To develop a positive voltage $+V_{OP}$ across load resistor $R_L$, signal D is supplied with a relatively high voltage level and signal DB is supplied with a relatively low voltage level. Therefore, switches 4 and 10 are on (i.e., conducting state), whereas switches 6 and 8 are off (non-conducting state). Accordingly, current $I_O$ flows from current sourcing NMOS transistor 2 to the ground terminal via switch 4, load resistor $R_L$, switch 10 and current-sinking PMOS transistor 12. Because under these conditions, switches 4 and 10 are in conducting states and switches 6 and 8 are in non-conducting states and each of these switches is assumed to be an ideal switch, terminal A is at the same voltage level ($V_{OH}$) as node N5, and terminal B is at the same voltage level ($V_{OL}$) as node N10.

Resistors 16 and 18 of the voltage dividing circuit 24 have substantially the same resistance, therefore, the voltage $V_{CM}$ at node N15 is approximately equal to the average value of the voltage levels at terminals A and B. In other words, voltage $V_{CM}$ is the average of voltages $V_{OH}$ and $V_{OL}$. Because resistors 14 and 16 are selected so as to have relatively high resistance values compared to resistor $R_L$, substantially all of $I_O$ is assumed to flow through resistor $R_L$.

Similarly, to develop a negative voltage $-V_{OP}$ across load resistor $R_L$, signal D is supplied with a relatively low voltage level and signal DB is supplied with a relatively high voltage level. Therefore, switches 4 and 10 are in non-conducting state, whereas switches 6 and 8 are in conducting states. Accordingly, current $I_O$ flows from current-sourcing NMOS transistor 2 to the ground terminal via switch 6, load resistor $R_L$, switch 8 and current-sinking PMOS transistor 12. Because under these conditions, switches 4 and 10 are in non-conducting states and switches 6 and 8 are in conducting states, terminal A is at the same voltage level as node N10, and terminal B is at the same voltage level as node N5. Because of the symmetry of operation with respect to the polarity of the input signals, node N15 is at the same voltage level $V_{CM}$. Filter capacitor 18 filters out the transient voltage signals that may develop at node N15 when input signals D and DB make low-to-high or high-to-low transitions.

The output common mode offset voltage signal VOS and the differential output voltage signal VOD of output driver 100 are defined as below:

$$V_{OD} = V_{OH} - V_{OL} \quad (1)$$

$$V_{OS} = \frac{V_{OH} + V_{OL}}{2} \quad (2)$$

The TIA/EIA-644-A standard requires signal $V_{OS}$ to be between 1125 mV and 1375 mV, and signal $V_{OD}$ to be between 250 mV and 450 mV.

In accordance with the present invention, voltage signal $V_{OL}$ tracks voltage signal $V_{ROL}$, and therefore voltage signal $V_{OL}$ is regulated to be equal to the voltage signal $V_{ROL}$. Similarly, voltage signal $V_{OS}$ tracks reference voltage $V_{ROS}$, and therefore voltage signal $V_{OS}$ is regulated to be equal to the voltage signal $V_{ROS}$. Voltage signal $V_{OL}$ is regulated using a first voltage regulating circuit formed by OTA 22 and PMOS transistor 12, which in combination also form a first control loop. Similarly, voltage signal $V_{OS}$ is regulated using a second voltage regulating circuit formed by OTA 20, NMOS transistor 2, and voltage dividing circuit 24, which in combination also form a second control loop.

The non-inverting input terminal of OTA 22 receives voltage $V_{ROL}$ and the inverting input terminal of OTA 22 is coupled to node N10. If the voltage at node N10 falls below $V_{ROL}$, OTA 22 increases the voltage applied to the gate terminal of PMOS transistor 12, thereby causing PMOS transistor 12 (i.e., current sinking circuit 12) to become less conductive and thus lowering the current that flows through PMOS transistor 12. This causes the voltage at node N10 to increase and cancel out the factors that caused the voltage at node N10 to fall below $V_{ROL}$. Similarly, when the voltage at node N10 raises above $V_{ROL}$, OTA 22 decreases the voltage applied to the gate terminal of PMOS transistor 12, thereby causing PMOS transistor 12 to become more conductive and thus increasing the current that flows through PMOS transistor 12. This causes the voltage at node N10 to decrease and cancel out the factors that caused the voltage at node N10 to raise above $V_{ROL}$. Accordingly, this feed-back loop regulates and maintains the voltage $V_{OL}$ of node N10 at a voltage level substantially equal to the reference voltage $V_{ROL}$.

The non-inverting input terminal of OTA 20 receives voltage signal $V_{ROS}$ and its inverting input terminal is coupled to node N15. If the voltage at node N15 falls below $V_{ROS}$, OTA 22 increases the voltage applied to the gate terminal of NMOS transistor 2 (i.e., current-sourcing NMOS transistor 2), thereby causing NMOS transistor 2 to become more conductive and thus increasing the current that flows through NMOS transistor 2. This causes the voltage at node N15 to increase and cancel out the factors that caused the voltage at node N15 to fall below $V_{ROS}$. Similarly, if the voltage at node N15 increases above $V_{ROS}$, OTA 22 decreases the voltage applied to the gate terminal of NMOS transistor 2, thereby causing NMOS transistor 2 to become less conductive and thus decreasing the current that flows through NMOS transistor 2. This causes the voltage at node N15 to decrease and cancel out the factors that caused the voltage at node N15 to increase above $V_{ROS}$. Accordingly, this feed-back loop regulates and maintains the voltage $V_{CM}$ of node N15 at a voltage level substantially equal to the reference voltage $V_{ROS}$.

Since voltage $V_{CM}$ is the average of the voltages $V_{OL}$ and $V_{OH}$, voltages $V_{CM}$ and $V_{OS}$—defined in the above equation (2)—are substantially the same. Consequently, the second control loop regulates voltage $V_{OS}$ at a level that is substantially equal to the level of the voltage $V_{ROS}$. Furthermore, differential output voltage $V_{OD}$ and the common-mode offset voltage $V_{OS}$ may also be defined in terms of the applied reference voltages $V_{ROL}$ and $V_{ROS}$, as shown below:

$$V_{OD}=2\times(V_{ROS}-V_{ROL}) \quad (3)$$

$$V_{OS}=V_{ROS} \quad (4)$$

Applied reference voltage $V_{ROS}$ is typically selected to have a value of, e.g., 1250 mV (i.e., the mid point of voltage levels 1125 mV to 1375 mV specified by the TIA/EIA-644-A standard) to allow for variations in, e.g., process, voltage and temperature. In accordance with equation (3), voltage $V_{ROL}$ is set to, for example, 1075 mV, so as to provide a typical value of 350 mV for voltage $V_{OD}$.

As described above, each of transistor 4, 6, 8, 10 has a non-ideal switching characteristic. This non-ideal switching characteristic causes a voltage drop across each of these transistors when that transistor is in a conducting state. Such a voltage drop may reduce the differential output swing below the specification limits. One method for compensating for this voltage drop is to decrease the reference voltage $V_{ROL}$ by an amount representative of such a voltage drop, thereby causing the voltage $V_{OD}$ to fall within the required limits, as described further below.

Figure 3:
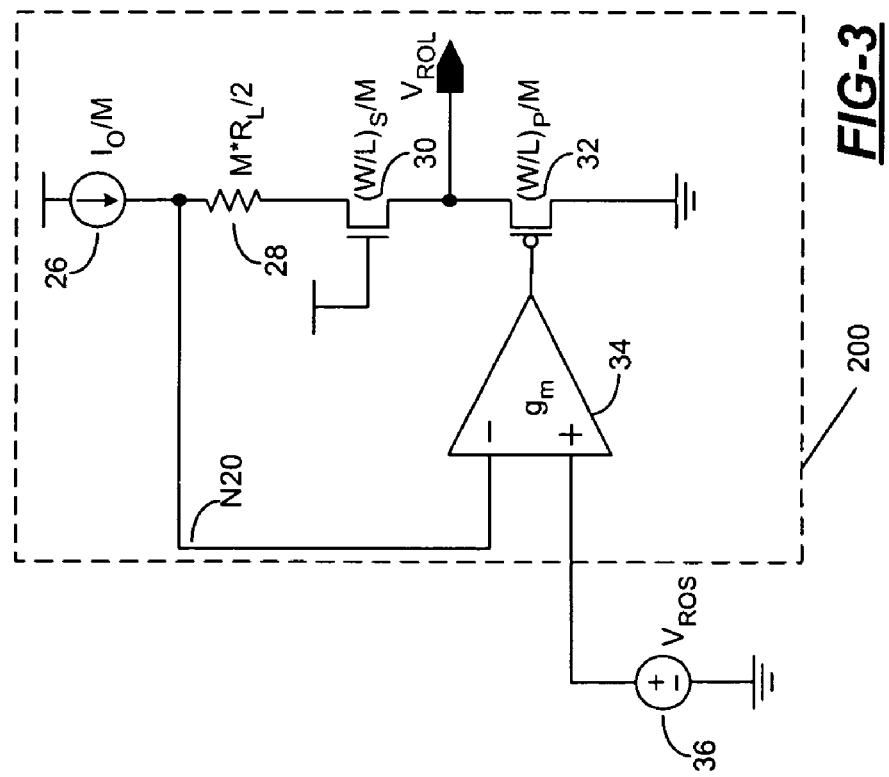
FIG. 3 is a schematic diagram of a replicating circuit adapted to supply a reference voltage to the low-voltage differential signal driver of FIG. 2.

FIG. 3 shows the schematic diagram of an LVDS output replication circuit 200, in accordance with the present invention, adapted to compensate for the voltage drop resulting from the non-ideal switching characteristics of transistors 4, 6, 8, 10. As seen from FIG. 3, LVDS output replication circuit 200 (hereinafter alternatively referred to as replication circuit 200) receives first supply voltage $V_{ROS}$, and in response, generates output signal $V_{ROL}$ via a control loop that includes PMOS transistor 32, OTA 34, DC current source 26, resistor 28, and NMOS transistor 30.

Concurrent references are made to FIGS. 2 and 3 below. Resistor 28 of replication 200 replicates (i.e., mimics) half of load resistor $R_L$ of FIG. 2. NMOS transistor 30 replicates either of NMOS transistor 8 and 10, whichever is in a conducting state. DC current source 26 replicates current $I_O$ flowing through NMOS transistor 2. In order to minimize the power consumption, the transistors and resistor in replication circuit 200 are selected so as to operate at a current level of $I_O/M$, where M is a positive number greater than unity. Thus, replica resistor 28 of FIG. 3 is selected to have a resistance of $M*R_L/2$. Similarly, the ratio of the channel-width to channel-length $(W/L)_{30}$ of replica NMOS transistor 30 of FIG. 3 is selected so as to be equal to $(W/L)_s/M$, where $(W/L)_s$ is the ratio of the channel-width to channel-length of the replicated NMOS transistors 8 and 10. Since transistor 30 is adapted to replicate either transistor 8 or transistor 10 when it is in a conducting state, the gate terminal of transistor 30 is coupled to the positive voltage supply terminal. Replica PMOS transistor 32 replicates PMOS transistor 12 of FIG. 2. Accordingly, the ratio of the channel-width to channel-length $(W/L)_{32}$ of replica PMOS transistor 32 of FIG. 3 is selected so as to be equal to $(W/L)_P/M$, where $(W/L)_P$ is the ratio of the channel-width to channel-length of the replicated PMOS transistor 12.

Voltage supply signal $V_{ROS}$ is applied to the non-inverting input terminal of OTA 34. If the voltage level at node N20 falls below $V_{ROS}$, OTA 34 increases the voltage applied to the gate terminal of PMOS transistor 32. This causes PMOS transistor 32 to become less conductive, thereby increasing the voltage at node N20. Similarly, when the voltage at node N20 raises above $V_{ROS}$, OTA 34 decreases the voltage applied to the gate terminal of PMOS transistor 32, thereby decreasing the voltage at node N20. Thus, the voltage at node N20 is regulated and maintained at a level substantially equal to voltage $V_{ROS}$. As shown in equation (4), voltage $V_{ROS}$ is also substantially equal to the output offset voltage $V_{OS}$.

Since the current flowing through replica current source 26 is equal to $I_O/M$ ($I_O$ is the current that flows through NMOS transistor 2 shown in FIG. 2), the voltage drop across resistor 28 of output replica 200 is half of the voltage drop across load resistor $R_L$. Similarly, the voltage drop across replica NMOS transistor 30 is equal to the voltage drop across either NMOS transistor 8 or 10, whichever is conducting. Voltage $V_{ROL}$ generated by replication circuit 200 thus includes an offset voltage that is substantially equal to the voltage drop across NMOS transistors 8, 10 when they are in conducting states. Therefore, voltage $V_{ROL}$ accounts for the effect of non-zero on-resistances of transistors 4, 6, 8, 10 on the output differential voltage $V_{OD}$.

Figure 4:
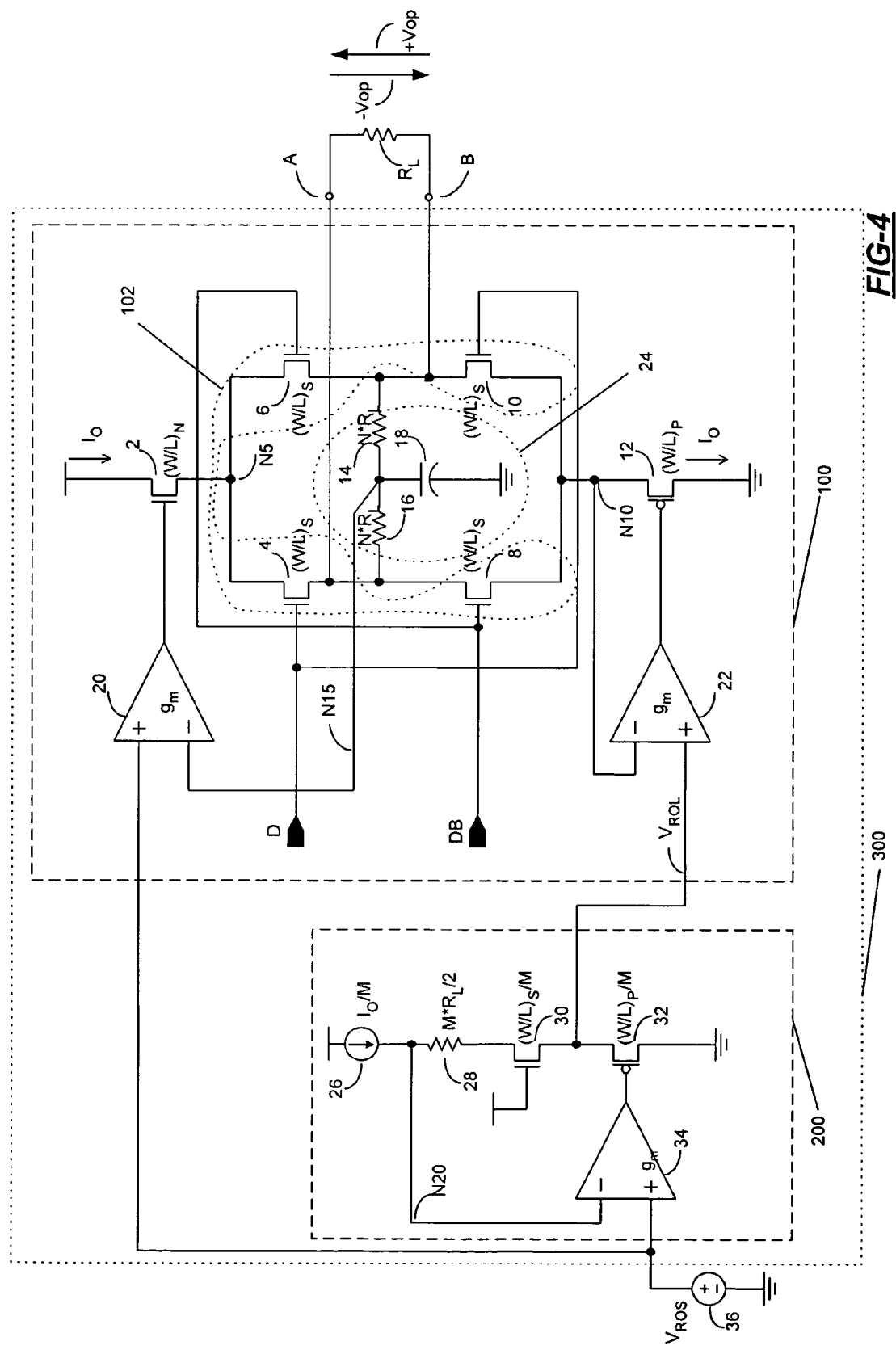
FIG. 4 shows the low-voltage differential signal driver of FIG. 2 coupled to the replicating circuit of FIG. 3.

FIG. 4 shows a schematic diagram of LVDS transmitter circuit 300 that is formed by coupling replication circuit 200 to LVDS output driver circuit 100. As seen from FIG. 4, LVDS transmitter 300 receives, in part, a second voltage supply that supplies a voltage to, e.g., NMOS transistor 2, and voltage supply $V_{ROS}$ that supplies a voltage to the non-inverting input terminals of OTAs 20 and 34. Output voltages generated and delivered to output terminals A and B comply with the TIA/EIA-644-A. The voltage applied to the non-inverting input terminal of OTA 22 is supplied by replication circuit 200.

Figure 5:
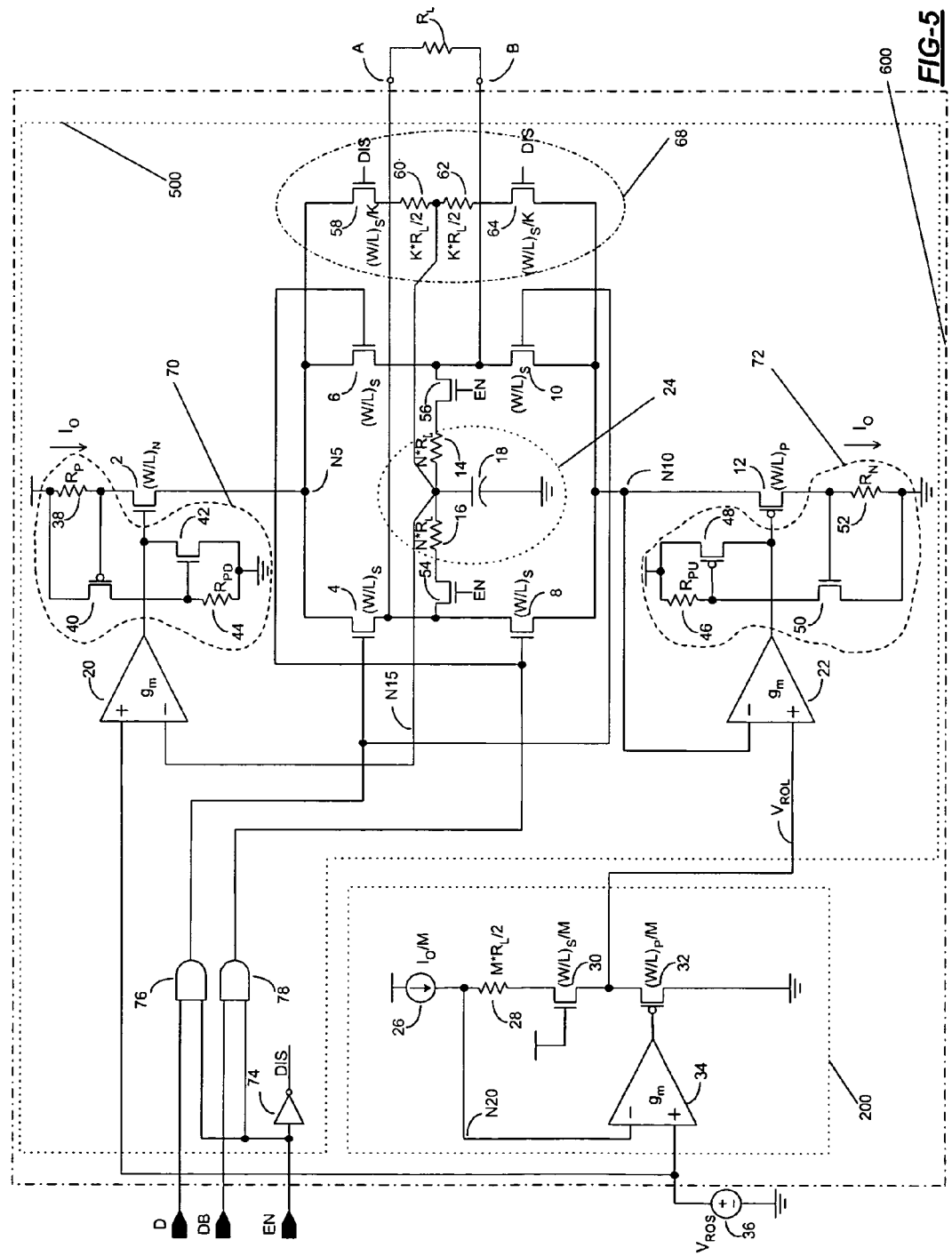
FIG. 5 is a schematic diagram of a low-voltage differential signal driver, in accordance with another embodiment of the present invention.

FIG. 5 shows the schematic diagram of an LVDS transmitter 600, in accordance with another embodiment of the present invention. LVDS transmitter 600 includes, in addition to the components disposed in LVDS 300 of FIG. 4, a negative current limiting circuitry 70, a positive current limiting circuitry 72, output tri-state circuitry 68, transistors 54 and 56, AND gates 76, 78 and inverter 74.

Negative current limiting circuitry 70 includes a current sense resistor 38, a pull-down resistor 44, an NMOS transistor 42 and a PMOS transistor 40. Negative current limiting circuitry 70 inhibits high levels of current flow to terminals A or B under certain fault conditions. One such condition occurs when terminals A or B are short-circuited to the ground terminal. Under normal operating conditions, the voltage drop across resistor 38 is less than the threshold voltage of PMOS transistor 40. Thus, no current flows through PMOS transistor 40 or pull-down resistor 44. As a result, the voltage at the gate terminal of NMOS transistor 42 is pulled down to ground potential via resistor 44.

If a fault condition occurs, e.g., a short-circuit occurs between one or both output terminals A, B and the ground terminal, the current through NMOS transistor 2 increases beyond its normal operating range. The increase in this current causes the voltage across resistor 38 to increase, thereby turning on PMOS transistor 40. Therefore, current flows through PMOS transistor 40 and resistor 44. The resulting voltage drop across resistor 44 turns on NMOS transistor 42. Therefore, the gate-to-source voltage of NMOS transistor 2 is reduced to a level that limits the current through NMOS transistor 2 to a safe level. The resistances of resistors 38 and 44 and the channel dimensions of PMOS transistor 40 and NMOS transistor 42 are selected such that the required current limit is achieved.

Positive current limit circuitry 72 includes a current sense resistor 52, a pull-up resistor 46, a PMOS transistor 48 and an NMOS transistor 50. Positive current limit circuitry 72 inhibits high levels of currents flow to terminals A or B under certain fault conditions. One such condition occurs when terminals A or B are short-circuited to the positive supply terminal. Under normal operating current conditions, the voltage drop across resistor 52 is less than the threshold voltage of NMOS transistor 50. Thus, no current flows through the NMOS transistor 50 or pull-up resistor 46. As a result, the voltage at the gate terminal of PMOS transistor 48 is raised to the positive supply potential via pull-up resistor 46.

If a fault condition, e.g., a short-circuit occurs between one or both output terminals A, B and the positive supply terminal, the current through PMOS transistor 12 increases beyond its normal operating range. The increase in this current causes the voltage drop across resistor 52 to increase, thereby turning on NMOS transistor 50. Therefore, current flows through NMOS transistor 50 and resistor 46. The resulting voltage drop across resistor 46 turns on PMOS transistor 48. Therefore, the gate-to-source voltage of PMOS transistor 12 is reduced to a level that limits the current flow through PMOS transistor 12 to a safe level. The resistances of resistors 46 and 52 and the channel dimensions of PMOS transistor 48 and NMOS transistor 50 are selected such that the required current limit is achieved.

In some applications, two or more LVDS output drivers may be coupled to the differential data bus. In these applications, it is required to selectively disable (i.e., tri-state) the output signals of all but one of the LVDS drivers. The data from the non-disabled driver is delivered to the bus for transmission. Transistors 58, 64 and resistors 60, 62 shown within the dashed perimeter line 68, in combination with NMOS transistors 54 and 56, AND gates 76 and 78 and inverter 74 form a tri-state output circuit that enables or disables the delivery of output signals to terminals A and B, as described further below.

When signal EN is at a high level, signal D is delivered to NMOS transistors 4, 10 via AND gate 76, and signal DB is delivered to NMOS transistors 6, 8, via AND gate 78. Similarly, NMOS transistors 54 and 56 are both conducting, thus coupling voltage dividing circuit 24 to terminals A and B. Furthermore, because signal DIS is at a low level, NMOS transistors 58 and 64 are turned off, therefore, transistors 58, 64 and resistors 60, 62 are decoupled from LVDS output driver 500. Accordingly, when signal EN is at a high level, LVDS output driver 500 is enabled and operates in the normal mode, as described in detail above. The on-resistance of each of NMOS transistors 54 and 56 is selected to be lower than the resistance of resistors 14 and 16. Therefore, the effect of the on-resistance of NMOS transistors 54 and 56 on the operation described above is negligible.

In order to tri-state the output signals, i.e., force the output signals to a high-impedance state, signal EN is set to a low level, thereby turning off NMOS transistors 4, 6, 8 and 10. Similarly, because signal EN is at a low level, both NMOS transistors 54 and 56 are also off, thereby decoupling voltage dividing circuit 24 from the terminals A and B, which in turn, breaks the feedback path of the control loop formed by OTA 20 and NMOS transistor 2.

To prevent node N5 from having an undefined voltage level when terminals A and B are tri-stated, circuitry 68 provides a feedback loop supplying the voltage present at the common terminal of resistors 60 and 62 to the inverting input terminal of OTA 20. This feed-back loop further ensures that differential output voltage between terminals A and B reaches its value without undergoing excessive delays after signal EN is forced to a high logic level.

Channel dimensions of NMOS transistors 58 and 64 are selected so as to have a channel-width to channel-length ratio that is equal to $(W/L)_s/K$ where $(W/L)_s$ is the ratio of the channel-width to channel-length of any one of NMOS transistors 4, 6, 8, 10, and K is a positive number greater than unity. The resistance of each of resistors 60 and 62 is selected to have a value of $K*R_L/2$ where $R_L$ is the resistance of the external load resistor. Thus, when signal EN is at a low level, NMOS transistors 58 and 64 are turned on, and a current having the size of $I_O/K$ flows through transistor 58, resistor 60, resistor 62, and transistor 64, thereby replicating the operation of one half of the current steering circuit 102. The voltage developed at node N15 is therefore equal to $V_{OS}$, thereby keeping the value of the voltage signal delivered via the feedback loop constant. This ensures that the voltage at node N5 is kept at substantially the same level, regardless of whether the LVDS driver output signals are enabled or tri-stated (disabled). This also ensures that data transmission may start shortly after the output signals are enabled.

The above embodiments of the present invention are illustrative and not limitative. The invention is not limited by the type of amplifier used in the low-voltage differential signal driver of the present invention. The invention is not limited by the type of integrated circuit in which the low-voltage differential signal driver of the present invention may be disposed. Nor is the invention limited to any specific type of process technology, e.g., CMOS, Bipolar, or BICMOS, or otherwise that may be used to manufacture the low-voltage differential signal driver of present invention. Other additions, subtractions, deletions, and modifications may be made without departing from the scope of the present disclosure as set forth in the appended claims.

What is claimed is:

1. A low-voltage differential signal driver having first and second output terminals, the low-voltage differential signal driver comprising:
   a current sourcing circuit adapted to generate a current;
   a current steering circuit coupled to receive the generated current and first and second input signals, wherein in response to the first and second input signals the current steering circuit steers the current either in a first direction to generate a positive differential voltage across the first and second output terminals or in a second direction to generate a negative differential voltage across the first and second output terminals;
   a current sinking circuit coupled to the current steering circuit and adapted to receive and sink the generated current;
   a voltage dividing circuit disposed between the first and second output terminals and adapted to divide the voltage generated between the first and second output terminals;
   a first voltage regulating circuit coupled to the current sinking circuit and the current steering circuit at a first node adapted to maintain a voltage that remains constant as a resistance of an external load coupled between the first and second output terminals varies; and a second voltage regulating circuit coupled to the current sourcing circuit and the voltage dividing circuit.

2. The low-voltage differential signal driver of claim 1, wherein said first voltage regulating circuit further comprises a first differential amplifier and wherein said second voltage regulating circuit further comprises a second differential amplifier.

3. The low-voltage differential signal driver of claim 2 further comprising a replicating circuit adapted to receive a first voltage supply signal and deliver a first reference voltage signal to the first voltage regulating circuit.

4. The low-voltage differential signal driver of claim 3 wherein said first voltage supply supplies its voltage signal to the second voltage regulating circuit.

5. The low-voltage differential signal driver of claim 4 wherein said replicating circuit further comprises a third voltage regulating circuit.

6. The low-voltage differential signal driver of claim 5 further comprising a first current limiting circuitry coupled to the curt sourcing circuit and adapted to limit the current flow out of the first and second output terminals during a first condition.

7. The low-voltage differential signal output driver of claim 6 further comprising a second curt limiting circuitry coupled to the current sinking circuit and adapted to limit the current flow into the first and second output teals during a second condition.

8. The low-voltage differential signal driver of claim 7 further comprising a tri-stating circuit adapted to tri-state signals present on the first and second output terminals.

9. The low-voltage differential signal driver of claim 8, wherein said tri-stating circuit is further adapted to supply a signal to the voltage dividing circuit.

10. The low-voltage differential signal output driver of claim 5 wherein said current sourcing circuit includes a first MOS transistor having a gate terminal adapted to receive an output signal generated by the second differential amplifier and a current carrying terminal coupled to a second node disposed in the current steering circuit.

11. The low-voltage differential signal output driver of claim 10 wherein said current sinking circuit includes a second MOS transistor having a gate terminal adapted to receive an output signal generated by the first differential amplifier and a current carrying terminal coupled to the first node disposed in the current steering circuit.

12. The low-voltage differential signal driver of claim 11 wherein said current steering circuit includes a third, forth, fifth and sixth MOS transistors, wherein said third MOS transistor has a gate terminal adapted to receive the first input signal, a first current carrying terminal coupled to the second node and a second current carrying terminal coupled to the first output terminal, wherein said fourth MOS transistor has a gate terminal adapted to receive the second input signal, a first current carrying terminal coupled to the first output terminal and a second current carrying terminal coupled to the first node, wherein said fifth MOS transistor has a gate terminal adapted to receive the second input signal, a first current carrying terminal coupled to the second node and a second current carrying terminal coupled to the second output terminal, and wherein said sixth MOS transistor has a gate terminal adapted to receive the first input signal, a first current carrying terminal coupled to the second output terminal and a second current carrying terminal coupled to the first node.

13. The low-voltage differential signal driver of claim 12 wherein said voltage dividing circuit comprises a first resistor having a first terminal coupled to the first output terminal and a second resistor having a first terminal coupled to the second output terminal.

14. The low-voltage differential signal driver of claim 12 wherein said voltage dividing circuit further comprises a capacitor having a first terminal coupled to the second terminal of each of the first and second resistors and a second terminal that is coupled to the ground.

15. The low-voltage differential signal driver of claim 12 wherein said first differential amplifier is further coupled to the first node.

16. The low-voltage differential signal driver of claim 12 wherein said second differential amplifier is further coupled to the second terminal of each of the first and second resistors.

17. The low-voltage differential signal driver of claim 16 wherein said first reference voltage supplied by the replicating circuit includes an offset voltage representative of a voltage drop across one of the third, fourth, fifth and sixth MOS transistors.

18. The low-voltage differential signal driver of claim 17 wherein said third voltage regulating circuit further comprises a third differential amplifier.

19. The low-voltage differential signal driver of claim 18 wherein said replicating circuit further comprises a second current source, a third resistor, a seventh MOS transistor and an eight MOS transistor, wherein a fist terminal of the third resistor is coupled to a second current source and to a first input terminal of the third differential amplifier, wherein a second terminal of the third resistor is coupled to a first current carrying terminal of the seventh MOS transistor having a gate terminal coupled to a second voltage supply and a second current carrying terminal coupled to a first current carrying terminal of the eight MOS transistor, wherein a second current carrying terminal of the eight MOS transistor is coupled to the ground terminal and wherein a gate terminal of the eighth MOS transistor is coupled to an output terminal of the third differential amplifier, and wherein a second input terminal of the third differential amplifier receives the first voltage supply signal.

20. The low-voltage differential signal driver of claim 19 wherein each of the first and second resistors is adapted to have a resistance equal to N of the resistance of a load resistor disposed between the first and second output terminals.

21. The low-voltage differential signal driver of claim 20 wherein said third resistor is adapted to have a resistance equal to M/2 of the resistance of the load resistor disposed between the first and second output terminals.

22. The low-voltage differential signal driver of claim 21 wherein each of said third, fourth, fifth and sixth MOS transistors have the same channel width to channel length ratio (W/L) and wherein said seventh MOS transistor has a channel width to channel length ratio that is equal to (W/L)/M.

23. The low-voltage differential signal driver of claim 22 wherein the channel width to channel length ratio of said eight MOS transistor is equal to 1/M of the channel width to channel length ratio of the second MOS transistor.

24. The low-voltage differential signal driver of claim 23 wherein a second current carrying terminal of the first MOS transistor is coupled to the second voltage supply and wherein a second current carrying terminal of the second MOS transistor is coupled to the ground.

25. The low-voltage differential signal driver of claim 23 wherein the second current carrying terminal of the first MOS transistor is coupled to a first terminal of a fourth resistor aid to a gate terminal of a ninth MOS transistor having a first current carrying terminal coupled to the second voltage supply and a second current carrying terminal coupled to a first terminal of a fifth resistor and a gate terminal of a tenth MOS transistor, wherein the second terminal of the fourth resistor is coupled to the second voltage supply and wherein the second terminal of the fifth resistor is coupled to the ground terminal, wherein a first current carrying terminal of the tenth MOS transistor is coupled to the ground terminal and wherein the second current carrying terminal of the tenth MOS transistor is coupled to the gate terminal of the first MOS transistor.

26. The low-voltage differential signal driver of claim 25 wherein the second current carrying terminal of the second MOS transistor is coupled to a first terminal of a sixth resistor and to a gate terminal of an eleventh MOS transistor having a first current terminal coupled to the ground and a second current coupled to a first terminal of a seventh resistor and a gate terminal of a twelfth MOS transistor, wherein the second terminal of the sixth resistor is coupled to the ground and wherein the second terminal of the seventh resistor is coupled to the second supply voltage, wherein a first current carrying terminal of the twelfth MOS transistor is coupled to the second voltage supply and wherein the second current carrying terminal of the twelfth MOS transistor is coupled to the gate terminal of the second MOS transistor.

27. A method for supplying a low-voltage differential signal across first and second output terminals, the method comprising:

generating a current;

steering the generated current in a first direction to generate a positive differential output voltage across the first and second output terminals in response to a first set of input signals and steering the generated current in a second direction to generate a negative differential output voltage across the first and second output terminals in response to a second set of input signals;

dividing the differential output voltage generated between the first and second output terminals to generate a weighted average thereof;

regulating the weighted average of the differential output voltage;

sinking the generated current via a first node adapted to maintain a first voltage that remains constant as a resistance of an external load coupled between the and second output terminal varies.

28. The method of claim 27 wherein the weighted average of the differential output voltage is regulated using an operational amplifier that receives a first supply voltage at one of its input terminals.

29. The method of claim 28 wherein the first voltage is regulated using a reference voltage generated by a replicating circuit.

30. The method of claim 29 further comprising:

limiting the current flowing out of or into the first and second output terminals.

31. The method of claim 30 further comprising:

tri-stating the first and second output terminals.

* * * * *